(12) United States Patent
Miyoshi

(10) Patent No.: US 11,510,415 B2
(45) Date of Patent: Nov. 29, 2022

(54) FROZEN STRAWBERRY AND METHOD FOR PRODUCING THE SAME

(71) Applicant: AOHATA CORPORATION, Hiroshima (JP)

(72) Inventor: Toru Miyoshi, Hiroshima (JP)

(73) Assignee: Aohata Corporation, Hiroshima (JP)

( * ) Notice: Subject to any disclaimer, the term of this patent is extended or adjusted under 35 U.S.C. 154(b) by 0 days.

(21) Appl. No.: 17/258,632

(22) PCT Filed: Apr. 2, 2020

(86) PCT No.: PCT/JP2020/015144
§ 371 (c)(1),
(2) Date: Jan. 7, 2021

(87) PCT Pub. No.: WO2020/217915
PCT Pub. Date: Oct. 29, 2020

(65) Prior Publication Data
US 2021/0244039 A1 Aug. 12, 2021

(30) Foreign Application Priority Data
Apr. 24, 2019 (JP) .............................. JP2019-083283

(51) Int. Cl.
| A23B 7/04 | (2006.01) |
| A23B 7/08 | (2006.01) |
| A23L 3/16 | (2006.01) |
| A23L 19/00 | (2016.01) |

(52) U.S. Cl.
CPC ............... *A23B 7/04* (2013.01); *A23B 7/085* (2013.01); *A23L 3/165* (2013.01); *A23L 19/00* (2016.08)

(58) Field of Classification Search
CPC ............ A23B 7/04; A23B 7/085; A23L 3/165
See application file for complete search history.

(56) References Cited

U.S. PATENT DOCUMENTS

| 3,025,169 | A | * | 3/1962 | Guadagni | ................ | A23B 7/05 |
| | | | | | | 426/268 |
| 6,254,919 | B1 | * | 7/2001 | Phillips | ................... | A23B 7/08 |
| | | | | | | 426/639 |
| 2013/0280400 | A1 | * | 10/2013 | Bartoshuk | .............. | A23L 27/39 |
| | | | | | | 426/538 |

FOREIGN PATENT DOCUMENTS

| CN | 101480243 A | 7/2009 |
| CN | 101601432 A | 12/2009 |
| CN | 104026214 A | 9/2014 |
| CN | 105685209 A | 6/2016 |
| CN | 109349401 A | 2/2019 |
| EP | 0166600 A2 | 1/1986 |
| EP | 0431703 A2 | 6/1991 |
| EP | 1123657 A1 * | 8/2001 | ............... A23B 7/08 |
| JP | H03251140 A | 11/1991 |
| JP | H5-219894 A | 8/1993 |
| JP | H06245692 A | 9/1994 |
| JP | H11276062 A | 10/1999 |
| JP | 2010-124767 A | 6/2010 |
| JP | 6688419 B1 | 4/2020 |
| WO | WO-9962346 A1 * | 12/1999 | ............. A23B 7/155 |

OTHER PUBLICATIONS

Yoshinor Ueda and Takashi Iwata, "Off-odor of Strawberry by Freezing", J. Japan. Soc. Hort. Sci. 51(2): pp. 219-223. 1982.
English translation: Yoshinori Ueda and Takashi Iwata, "Off-odor of Strawberry by Freezing", J. Japan Soc. Hort. Sci. 51(2): pp. 219-223. 1982.
Katsuyoshi Kaneko, Kazumoto Hashizume, Yuriko Ozawa and Ryoichi Masuda, "Change in Quality of Strawberries by Freezing and Freeze Storage", Rep. Natl. Food Res. Inst. No. 52, pp. 18-24 (1988).
English translation: Katsuyoshi Kaneko, Kazumoto Hashizume, Yuriko Ozawa and Ryoichi Masuda, "Change in Quality of Strawberries by Freezing and Freeze Storage", Rep. Natl. Food Res. Inst. No. 52, pp. 18-24 (1988).
Allowance of 2019-083283: Decision to grant a patent of JP 2019-083283.
English translation: Allowance of 2019-083283: Decision to grant a patent of JP 2019-083283.
Second Office Action of JP 2019-083283.
English translation: Second Office Action of JP 2019-083283.
First Office Action of JP 2019-083283.
English translation: First Office Action of JP 2019-083283.
Fujiko Yoshimatsu et al., ed., "Riron to Jissai no Chourigaku Jiten (Cooking Science Dictionary of Theory and Practice)", Asakura Shoten, Sep. 10, 1997, pp. 384.
English translation: Fujiko Yoshimatsu et al., ed., "Riron to Jissai no Chourigaku Jiten (Cooking Science Dictionary of Theory and Practice)", Asakura Shoten, Sep. 10, 1997, pp. 384.
Morris J.R., et al., "Relationship of Treatment of . . . "? Journal of Food Quality, Dec. 1991. vol. 14, No. 6, pp. 467-479.
Hong Deng and Yoshinori Ueda, "Effects of Freezing Methods and Storage Temperature on Flavor Stability and Ester Contents of Frozen Strawberries", J. Japan. Soc. Hort. Sci, 62(3): pp. 633-639. 1993.
English translation: Hong Deng and Yoshinori Ueda, "Effects of Freezing Methods and Storage Temperature on Flavor Stability and Ester Contents of Frozen Strawberries", J. Japan. Soc. Hort. Sci, 62(3): pp. 633-639. 1993.
Talens, P. et al., Study of the Influence of Osmotic Dehydration and Freezing on the Volatile Profile of Strawberries, Journal of Food Science, 2002, vol. 67, Nr. 5, p. 1648-1653.
Escriche, I. et al., Influence of Blanching-osmotic Dehydration Treatments on Volatile Fraction of Strawberries, Journal of Food Science, 2000, vol. 65, No. 7, p. 1107-1111.
International Search Report for PCT/JP2020/015144.
Chinese Office Action for Application No. 202080004180.4, dated Jun. 11, 2021, 13 pages.

* cited by examiner

*Primary Examiner* — Stephanie A Cox
(74) *Attorney, Agent, or Firm* — McCarter & English, LLP; David G. Conlin; Nathan D. Harrison

(57) ABSTRACT

An aspect of the present invention is a frozen strawberry having: a breaking load of not less than 10000 g and not more than 30000 g; and a breaking strain factor of not less than 15%.

5 Claims, No Drawings

FROZEN STRAWBERRY AND METHOD FOR PRODUCING THE SAME

CROSS-REFERENCES TO RELATED APPLICATIONS

This application is a U.S. national phase application, pursuant to 35 U.S.C. 371, of PCT/JP2020/015144, filed Apr. 2, 2020, designating the United States, which claims priority to Japanese Application No. 2019-083283, filed on Apr. 24, 2019. The entire contents of the aforementioned patent applications are incorporated herein by this reference.

TECHNICAL FIELD

The present invention relates to a frozen strawberry and a method for producing the frozen strawberry.

BACKGROUND ART

Examples of a reported method of freezing fruit include the following methods: (i) a method of freezing fruit that remains floating in a sugar solution (Patent Literature 1); (ii) a method of immersing fruit in an aqueous sugar solution without heating and under normal pressure, and freezing the fruit (Patent Literature 2); (iii) a method of air-drying a fruit material, then exposing the fruit material to an aqueous medium containing sugar, and subsequently freezing the fruit material (Patent Literature 3); and (iv) a method of treating fruit with syrup containing two or more monosaccharides or a monosaccharide(s) and sorbitol (Patent Literature 4).

Further, a smell that is given off when a strawberry is frozen has been reported as described in Non-patent Literatures 1 to 3.

However, for example, freezing a strawberry makes the strawberry hard, so that the strawberry is difficult to sink a tooth into. In view of this, a frozen strawberry still has room for improvement in mouthfeel.

CITATION LIST

Patent Literatures

Patent Literature 1

Japanese Patent Application Publication Tokukaihei No. 11-276062

Patent Literature 2

Japanese Patent Application Publication Tokukaihei No. 6-245692

Patent Literature 3

Japanese Patent Application Publication Tokukaihei No. 3-251140

Patent Literature 4

Japanese Patent Application Publication Tokukaihei No. 5-219894

Non-Patent Literatures

Non-Patent Literature 1

Ueda Yoshinori, Iwata Takashi, "*Ichigo kajitsu no touketsu-shu* [Freezing odor generated by strawberry fruit]", Journal of the Japanese Society for Horticultural Science 51(2), 1982, pp. 219-223

Non-Patent Literature 2

Deng Hong, Ueda Yoshinori, "Effects of Freezing Methods and Storage Temperature on Flavor Stability and Ester Contents of Frozen Strawberries", Journal of the Japanese Society for Horticultural Science 62(3), 1993, pp. 633-639

Non-Patent Literature 3

Kaneko Katsuyoshi, Hashizume Kazumoto, Ozawa Yuriko, Masuda Ryouichi, "*Ichigo no touketsu oyobi touketsu chozou-chu ni okeru hinshitsu henka* [Change in quality during freezing and frozen storage of strawberry]", Report of National Food Research Institute (52), 1988, pp. 18-24

SUMMARY OF INVENTION

Technical Problem

In view of the above, an object of an aspect of the present invention is to provide a frozen strawberry that has a better mouthfeel.

Solution to Problem

The inventors of the present invention diligently conducted extensive research in order to attain the object. As a result, the inventors finally accomplished the present invention by finding that even a strawberry that is in a frozen state is made better in mouthfeel by causing a breaking load and a breaking strain factor to fall within respective specific ranges.

That is, an aspect of the present invention is a frozen strawberry having:

a breaking load of not less than 10000 g and not more than 30000 g; and a breaking strain factor of not less than 15%.

An aspect of the present invention is a method for producing a frozen strawberry, including:

a heating step of using water, having a temperature of not less than 70° C. and not more than 100° C., to heat a strawberry, which is raw, for not less than 1 second and not more than 180 seconds;

a sugar immersion step of immersing the strawberry, having been subjected to the heating step, in a sugar solution for not less than 32 hours and not more than 7 days, the sugar solution having a temperature of not less than 0° C. and not more than 20° C.; and a freezing step of freezing the strawberry having been subjected to the sugar immersion step.

Advantageous Effects of Invention

An aspect of the present invention makes it possible to provide a frozen strawberry that has a better mouthfeel. Therefore, a frozen strawberry can be expected to further increase in demand.

DETAILED DESCRIPTION

Feature of the Present Invention

A frozen strawberry of an aspect of the present invention has a feature such that the frozen strawberry has: a breaking load of not less than 10000 g and not more than 30000 g; and a breaking strain factor of not less than 15%. Such a configuration allows the frozen strawberry to have a better mouthfeel. For example, although the above strawberry is frozen, the strawberry is easy to sink a tooth into. The frozen strawberry that has a breaking strain factor of not less than 15% is less resistant to a biting force and has a soft, chewy texture. The frozen strawberry that has a breaking load of not less than 10000 g and not more than 30000 g can be broken in the mouth by a light biting force. That is, it is possible to provide a frozen strawberry that is frozen but has a mouthfeel that is soft and allows a tooth to be easily sunk into the frozen strawberry.

Variety of Strawberry

According to the frozen strawberry in accordance with an aspect of the present invention, a strawberry that is frozen can be a strawberry of any variety. Examples of a strawberry include Sagahonoka, Nyohou, Toyonoka, Akihime, Raihou, Red Pearl, Askawave, Akanekko, Echigohime, Tochiotome, Asuka Ruby, Sachinoka, Tochihime, Amaterasu, Fukuoka S6gou (Amaou), Beni Hoppe, Summer Princess, HS138 (Natsumi), Natsunko (Caraynia), Yayoihime, Pechika, Kaorino (Registered Trademark), Wada Hatsukoi, Sakuramomoichigou, Chiba S4gou, Diamond Berry, Albion, Monterey, Sakihime, and Oita 6gou.

Breaking Load

The breaking load is a parameter that indicates fragility and hardness. The breaking load indicates a load applied when a target sample is broken. For example, the breaking load can be determined by the following method. Specifically, a plunger is forced into a sample at a constant speed, and a force applied to the sample is measured. A force applied when the sample is broken is regarded as the breaking load.

The frozen strawberry in accordance with an aspect of the present invention has a breaking load of not less than 10000 g and not more than 30000 g. The frozen strawberry that has a breaking load of less than 10000 g is not chewy. The frozen strawberry that has a breaking load of more than 30000 g is too hard and requires a great force by which to sink a tooth into the frozen strawberry. The frozen strawberry preferably has a breaking load of not less than 12000 g. The frozen strawberry that has a breaking load falling within the above range is a frozen strawberry that is more suitably chewy. The frozen strawberry preferably has a breaking load of not more than 20000 g. The frozen strawberry that has a breaking load falling within the above range is a frozen strawberry into which a tooth can be sunk by a lighter force.

Breaking Strain Factor

The breaking strain factor is a parameter that indicates a degree to which a sample deforms before the sample is broken by the breaking load. For example, the breaking strain factor can be determined by the following method. Specifically, the breaking load is determined by the method described earlier. A deformation ratio at which the sample deforms when the breaking load is determined is regarded as the breaking strain factor. The deformation ratio is $(Hi-Hf)/Hi(\times 100\%)$ where $Hi$ is a height of the sample which height is obtained immediately before the load is applied to the sample, and $Hf$ is a height of the sample which height is obtained when the sample is broken.

The frozen strawberry in accordance with an aspect of the present invention has a breaking strain factor of not less than 15%. The frozen strawberry that has a breaking strain factor of less than 15% is a frozen strawberry that feels hard until a tooth is sunk thereinto. Therefore, the frozen strawberry that has a breaking strain factor of less than 15% is a frozen strawberry that offers resistance to a tooth before the tooth is sunk into the frozen strawberry, even if the tooth is sunk into the frozen strawberry by a light force. The frozen strawberry has a breaking strain factor of preferably not less than 20% and not more than 42%, and more preferably not less than 20% and not more than 30%. The frozen strawberry that has a breaking strain factor falling within the above range has a mouthfeel that is neither too hard nor too soft but is moderately hard. Furthermore, a method for producing a frozen strawberry (described later) makes it possible to suitably produce a frozen strawberry that has such a breaking strain factor.

Component

The frozen strawberry of an aspect of the present invention is preferably configured such that the frozen strawberry contains 2-methylbutanoic acid and ethyl hexanoate, and the ethyl hexanoate is contained in an amount of not less than 1 part by weight with respect to 1 part by weight of the 2-methylbutanoic acid. Such a configuration allows the frozen strawberry to have a better flavor. 2-methylbutanoic acid is one of components responsible for an acid smell. Ethyl hexanoate is one of components responsible for a fruit-like scent. Ethyl hexanoate whose amount is not less than an amount of 2-methylbutanoic acid removes or reduces an acid smell. This results in obtainment of a frozen strawberry that has a better flavor. In a case where the frozen strawberry that has the breaking load (described earlier) and the breaking strain factor (described earlier) is configured to have a preferable aroma component composition and content described herein, an aroma component easily spreads into the mouth with a light mouthfeel. This results in obtainment of a frozen strawberry that has a better flavor.

The frozen strawberry of an aspect of the present invention is configured such that the ethyl hexanoate is contained in an amount of preferably not less than 1.5 parts by weight, and more preferably not less than 2, with respect to 1 part by weight of the 2-methylbutanoic acid. The frozen strawberry that contains the ethyl hexanoate and the 2-methylbutanoic acid at such a weight ratio has a better flavor.

An upper limit of a weight of the ethyl hexanoate with respect to 1 part by weight of the 2-methylbutanoic acid is not particularly limited. Note, however, that the weight that is greater allows the frozen strawberry to have a better flavor. The upper limit of the weight is, for example, 20 parts by weight.

The frozen strawberry of an aspect of the present invention is preferably configured such that the ethyl hexanoate is contained in an amount of not less than 500 ppb. The frozen strawberry of an aspect of the present invention has a better flavor because the frozen strawberry is frozen and further contains the ethyl hexanoate in a large amount. An upper limit of a contained amount of the ethyl hexanoate is not particularly limited. Note, however, that the contained amount that is larger allows the frozen strawberry to have a better flavor. The upper limit of the contained amount is, for example, 10000 ppb.

The frozen strawberry of an aspect of the present invention is more preferably configured such that the ethyl hexanoate is contained in an amount of not less than 500 ppb, and the 2-methylbutanoic acid is contained in an amount of not more than 600 ppb. With the configuration, the frozen strawberry has a better flavor due to (i) an acid smell component contained in a smaller amount and (ii) a fruit-like component contained in a larger amount.

The frozen strawberry of an aspect of the present invention is preferably configured such that the frozen strawberry contains 2-methylbutanoic acid ethyl. The frozen strawberry of an aspect of the present invention is more preferably configured such that the 2-methylbutanoic acid ethyl is contained in an amount of not less than 200 ppb. A stronger fruit-like scent allows the frozen strawberry to have a better flavor. An upper limit of a contained amount of the 2-methylbutanoic acid ethyl is not particularly limited. Note, however, that the upper limit of the contained amount is, for example, 1200 ppb.

Sugar Content

The frozen strawberry has a sugar content of, for example, not less than 15° Bx, and more preferably not less than 18° Bx. The sugar content is also preferably not more than 30° Bx, and more preferably not more than 25° Bx. The sugar content that falls within the above range allows the frozen strawberry to be more excellent in sweetness. The sugar content can be adjusted by a sugar concentration of a sugar solution used in a sugar immersion step described later, an immersion time in the sugar immersion step, and/or the like.

Water Content

A water content in the frozen strawberry is not particularly restricted. The water content is preferably not less than 70% by weight. The water content that falls within the above range allows the frozen strawberry to have a moister mouthfeel. The water content is also preferably not more than 80% by weight. The water content that falls within the above range allows a flavor of a strawberry to be further brought out in the frozen strawberry.

Additive

The frozen strawberry in accordance with an aspect of the present invention can contain an additive(s). Examples of the additive(s) include a coloring agent, a perfume, a sweetening agent, an acidulant, a Western liquor, vinegar, calcium (Ca) lactate, and an enzyme. The frozen strawberry in accordance with an aspect of the present invention has an extremely good flavor. Thus, without the need to add any of the additives listed above, it is possible to provide a frozen strawberry that has an excellent flavor.

Method for Producing Frozen Strawberry

A method for producing a frozen strawberry of an aspect of the present invention, includes: a heating step of using water, having a temperature of not less than 70° C. and not more than 100° C., to heat a strawberry, which is raw, for not less than 1 second and not more than 180 seconds; a sugar immersion step of immersing the strawberry, having been subjected to the heating step, in a sugar solution for not less than 32 hours and not more than 7 days, the sugar solution having a temperature of not less than 0° C. and not more than 20° C.; and a freezing step of freezing the strawberry having been subjected to the sugar immersion step. The method makes it possible to produce the frozen strawberry in accordance with an aspect of the present invention.

Raw Strawberry

A raw strawberry is used in the method for producing a frozen strawberry of an aspect of the present invention. A raw strawberry means a strawberry that is neither heated nor frozen after having been harvested. A strawberry can be pretreated as long as the strawberry is raw. Examples of a pretreatment include cutting of a calyx and washing. Another description of a strawberry is equivalent to the description provided earlier and is therefore omitted.

Heating Step

The heating step is a step of using water to heat a strawberry for not less than 1 second and not more than 180 seconds, the water having a temperature of not less than 70° C. and not more than 100° C. By carrying out the heating step under such a condition, it is possible to sterilize the strawberry while preventing or reducing a deterioration in flavor. This makes it possible to provide a frozen strawberry that can be stored safely and has a better flavor. Examples of a specific method of carrying out the heating step include (i) a method of storing the strawberry in a basket or the like so as to immerse the strawberry in a hot water bath and (ii) a method of converting, into steam, the water having the above temperature and then bringing the steam into contact with the strawberry. Other examples of the specific method of carrying out the heating step include (iii) a method of using superheated steam and/or aqua gas and (iv) electric heating.

Heating Temperature

A heating temperature of not less than 70° C. makes it possible to obtain a sterilizing effect. A heating temperature of less than 70° C. makes it less possible to obtain a sufficient sterilizing effect. This may cause growth of various germs during storage and/or during immersion in a sugar solution. In order to enhance the sterilizing effect, a heating temperature of not less than 75° C. is more preferable. A heating temperature of not more than 100° C. makes it possible to prevent or reduce a deterioration in flavor. In order to further prevent or reduce a deterioration in flavor, a heating temperature of not more than 95° C. is preferable, and a heating temperature of not more than 90° C. is more preferable. A heating temperature of more than 100° C. causes a deterioration in flavor and/or mouthfeel and causes a pulp surface to be soft and swollen.

Heating Time

A heating time and a heating temperature are preferably in a relationship in which the heating time is made shorter at a higher heating temperature, whereas the heating time is made longer at a lower heating temperature. Such a balance between the heating time and the heating temperature can be adjusted in accordance with the sterilizing effect. For example, from the viewpoint of the balance between the heating time and the heating temperature, the heating time is preferably 180 seconds at a heating temperature of 70° C., the heating time is preferably 1 second at a heating temperature of 100° C., and the heating time is preferably approximately 5 seconds to 90 seconds at a heating temperature of 75° C. to 95° C.

Sugar Immersion Step

In the sugar immersion step, the strawberry having been subjected to the heating step is immersed in a sugar solution for not less than 32 hours and not more than 7 days, the sugar solution having a temperature of not less than 0° C. and not more than 20° C. This allows sugar to uniformly permeate into the strawberry. As a result, it is possible to obtain a frozen strawberry that has an excellent flavor. Furthermore, in a case where the strawberry is immersed in the sugar solution at such a temperature for such a period of time, an offensive odor that is emitted by freezing (an acid smell:

2-methylbutanoic acid) can be produced in a smaller amount, and a fruit-like scent (ethyl hexanoate, 2-methylbutanoic acid ethyl) can be produced in a larger amount. Examples of a specific method of carrying out the sugar immersion step include placing the strawberry in a container containing a sugar solution. The container can be capped with a lid because the strawberry floats. Moreover, stirring can be carried out in the container. The breaking load, the breaking strain factor, and each of the components described earlier can be adjusted by adjusting a condition(s) under which to carry out the sugar immersion step. For example, a longer sugar immersion time tends to result in a lower breaking load and a higher breaking strain factor.

Sugar Solution

Sugar for use in the sugar immersion step can be selected as appropriate in accordance with, for example, a taste of a desired frozen strawberry. Examples of the sugar include fruit sugar (fructose), sucrose, glucose, and corn syrup. A sugar concentration of the sugar solution can be set as appropriate. For example, the sugar concentration is preferably not less than 30% by weight, and also preferably not more than 60% by weight. Further, for example, the sugar concentration is preferably not less than 35% by weight because such a sugar concentration makes it possible to suitably produce the frozen strawberry that has a sugar content of not less than 18° Bx (described earlier), and the sugar concentration is more preferably not more than 50% by weight because such a sugar concentration makes it possible to suitably produce the frozen strawberry that has a sugar content of not more than 25° Bx (described earlier).

Immersion Temperature

An immersion temperature at which to immerse the strawberry in the sugar solution is not less than 0° C. and not more than 20° C. An immersion temperature of not less than 0° C. allows the sugar to favorably permeate through the strawberry. This makes it possible to obtain a frozen strawberry that has a better flavor. An immersion temperature of less than 0° C. causes the sugar to permeate through the strawberry at a low speed. An immersion temperature of not more than 20° C. prevents or reduces a deterioration in flavor. This makes it possible to obtain a frozen strawberry that has a better flavor. Furthermore, an immersion temperature of not more than 20° C. allows pulp of the strawberry to be kept hard. This makes it possible to obtain a frozen strawberry that is highly chewy and has a good mouthfeel. A permeation temperature of more than 20° C. causes the strawberry to have a worse flavor and/or have a bad mouthfeel by becoming too soft. Moreover, a permeation temperature of more than 20° C. reduces methyl propionate, which is a fruit-like scent component. This causes the frozen strawberry to emit more heating odor.

In the sugar immersion step, the immersion temperature is more preferably not less than 0° C. and not more than 10° C. The immersion temperature that falls within the above range allows the frozen strawberry to be highly chewy and have a better flavor.

Immersion Time

In the sugar immersion step, the immersion time is not less than 32 hours and not more than 7 days. This immersion time allows the sugar to more favorably permeate into the strawberry. Furthermore, in a case where the strawberry is immersed in the sugar solution at the above immersion temperature for such a period of time, an acid smell component can be reduced and a fruit-like component can be increased. This results in obtainment of a frozen strawberry that has a better flavor. Moreover, since a part of a coloring matter eluted from a surface of the strawberry adheres to the strawberry as a whole, a frozen strawberry to be obtained has a more uniform color tone. This results in obtainment of a frozen strawberry that has an excellent color tone. For example, a raw strawberry has a white part near a calyx thereof. Note, however, that such a white part is also colored in the frozen strawberry to be obtained. This results in obtainment of a frozen strawberry that has a better color tone. In contrast, in a case where the immersion time is less than 32 hours at the immersion temperature described earlier, the sugar does not sufficiently permeate through the strawberry. This results in obtainment of a frozen strawberry that not only has a bad flavor but also has a bad mouthfeel. Furthermore, in a case where the immersion time is more than 7 days, the sugar solution excessively permeates into the strawberry. This results in obtainment of a frozen strawberry that has a bad flavor and a bad mouthfeel.

In the sugar immersion step, the immersion time is preferably not less than 48 hours, and more preferably not less than 72 hours. The immersion time is also preferably not more than 5 days, and more preferably not more than 4 days. The immersion time that falls within the above range allows a larger amount of sugar to permeate through the strawberry. This results in obtainment of a frozen strawberry which not only has sweetness and sourness that are better balanced but also has a better mouthfeel.

Freezing Step

In the freezing step, the strawberry only needs to be frozen. The strawberry having been subjected to the sugar immersion step is more preferably frozen by individual quick freezing (IQF freezing). Such a method makes it possible to obtain a frozen strawberry that is higher in quality (e.g., strawberry flavor and hardness). The freezing temperature is more preferably not more than −18° C. so that 2-methylbutanoic acid is contained in a smaller amount.

It is possible to carry out a pretreatment with respect to the strawberry that has not been subjected to the heating step. Examples of the pretreatment include removal of a calyx of the strawberry and cutting of the strawberry into a desired shape.

Color Tone

An aspect of the frozen strawberry of the present invention has an excellent color tone. A frozen strawberry may have a whitish calyx part and a pulp part that differ in color tone from the whitish calyx part, depending on a variety of the frozen strawberry. However, an aspect of the method for producing a frozen strawberry of the present invention also achieves a smaller difference in color between a pulp part and a calyx part of the frozen strawberry of such a variety. This is because the calyx part can be made reddish in a case where a coloring matter of the pulp part which coloring matter has been eluted into the sugar solution through the sugar immersion step is deposited on the calyx part.

Additional Remarks

As described earlier, an aspect of the present invention includes the following:

(1) a frozen strawberry having:
 a breaking load of not less than 10000 g and not more than 30000 g; and
 a breaking strain factor of not less than 15%;

(2) the frozen strawberry recited in (1) wherein
 the frozen strawberry contains 2-methylbutanoic acid and ethyl hexanoate, and
 the ethyl hexanoate is contained in an amount of not less than 1 part by weight with respect to 1 part by weight of the 2-methylbutanoic acid;

(3) the frozen strawberry recited in (2) wherein the frozen strawberry further contains 2-methylbutanoic acid ethyl, and the 2-methylbutanoic acid ethyl is contained in an amount of not less than 200 ppb;

(4) the frozen strawberry recited in (2) or (3) wherein the ethyl hexanoate is contained in an amount of not less than 500 ppb; and (5) a method for producing a frozen strawberry, including:

a heating step of using water, having a temperature of not less than 70° C. and not more than 100° C., to heat a strawberry, which is raw, for not less than 1 second and not more than 180 seconds;

a sugar immersion step of immersing the strawberry, having been subjected to the heating step, in a sugar solution for not less than 32 hours and not more than 7 days, the sugar solution having a temperature of not less than 0° C. and not more than 20° C.; and a freezing step of freezing the strawberry having been subjected to the sugar immersion step.

The present invention will be specifically described below based on Examples, Comparative Examples, and Test Examples. Note that the present invention is not limited to those Examples, Comparative Examples, and Test Examples.

EXAMPLES

Example 1

Sagahonoka was used as a raw strawberry. A calyx of the raw strawberry was removed, and then the raw strawberry was washed with water.

Heating Step

The strawberry thus washed was stored in a basket and immersed in a hot water bath, having a temperature of 85° C., for 60 seconds so as to be heated for sterilization. The strawberry thus heated was water-cooled for 1 minute. In the column "Heating" in Table 1 shown later, an example in which the heating step was carried out is denoted by "YES", and an example in which the heating step was not carried out is denoted by "NO".

Sugar Immersion Step

The strawberry was immersed in a sugar solution (containing fruit sugar in an amount of 44.5% by mass, citric acid in an amount of 0.5% by mass, and water in an amount of 55% by mass) at an immersion temperature of 10° C. for 4 days. The sugar solution was used in an amount of 400 g with respect to 500 g of strawberries. In the column "Sugar impregnation" in Table 1 shown later, an example in which the sugar immersion step was carried out is denoted by "YES", and an example in which the sugar immersion step was not carried out is denoted by "NO".

Freezing Step

The strawberry having been subjected to the sugar immersion step was frozen by IQF freezing at a temperature of not more than −20° C. so that a frozen strawberry in accordance with an aspect of the present invention was prepared. In the column "Freezing" in Table 1 shown later, an example in which the freezing step was carried out is denoted by "YES", and an example in which the freezing step was not carried out is denoted by "NO".

Examples 2 and 3

A frozen strawberry was prepared as in the case of Example 1 except that Sagahonoka, which is a variety of strawberry, was replaced with Albion (in Example 2) or Monterey (in Example 3).

Examples 4 and 5

A frozen strawberry was prepared in Example 4 as in the case of Example 1 except that in the heating step, the temperature of the hot water bath was set to 95° C., and the heating time was set to 30 seconds. A frozen strawberry was prepared in Example 5 as in the case of Example 1 except that the temperature of the hot water bath was set to 73° C., and the heating time was set to 3 minutes.

Comparative Example 1

A frozen strawberry was prepared as in the case of Example 2 except that the heating step and the sugar immersion step were not carried out.

Comparative Example 2

A frozen strawberry was prepared in Comparative Example 1 as in the case of Comparative Example 1 except that Albion, which is a variety of strawberry, was replaced with Sagahonoka.

Comparative Example 3

Sagahonoka whose calyx had been removed was washed with water, and then, without being subjected to the heating step, the sugar immersion step, and the freezing step, was subjected to an evaluation as it was.

Comparative Example 4

A strawberry was subjected to an evaluation of an aroma component after being subjected to the heating step as in the case of Example 1 without being subjected to the sugar immersion step and the freezing step.

Comparative Example 5

A frozen strawberry was prepared as in the case of Example 1 except that the sugar immersion step was not carried out.

Comparative Example 6

A commercially-available frozen strawberry (Company A) was used. It is unclear whether the heating step was carried out before sugar immersion.

Comparative Example 7

A frozen strawberry was prepared in as in the case of Example 1 except that in the heating step, the temperature of the hot water bath was set to 98° C., and the heating time was set to 30 minutes.

Measurement of Breaking Load and Breaking Strain Factor

TA.XT Plus, which is a texture analyzer manufactured by Stable Micro Systems, was used to carry out a measurement of a breaking load and a breaking strain factor. A cylindrical plunger having a diameter of 0.5 inches (model number: P/0.5R) was also used. The measurement was carried out at a speed of 2 mm/sec and a compressive strain factor of 80%. The frozen strawberry that had been subjected to the freezing step was subjected to the measurement at an air temperature of −16° C. to −18° C. In contrast, the strawberry that had not been subjected to the freezing step was subjected to the measurement at an air temperature of 20° C. The measurement involves (i) cutting lengthwise the strawberry into halves, (ii) placing one of the halves on a sample stage such that a cross section of the one of the halves faces downward, (iii) positioning the one of the halves so that the plunger will be inserted into a highest part of the one of the halves, and (iv) inserting the plunger into the highest part.

Determination of Aroma Component First, a column for use in aroma component extraction, concentration, column chromatography was prepared by (i) filling a glass column (φ2 cm×20 cm), provided with a filter, with 20 mL of PorapakQ (an ethylvinylbenzene-divinylbenzene copolymer, having 50 meshes to 80 meshes, manufactured by Waters) and (ii) washing the PorapakQ with diethyl ether, methanol, and pure water in this order. Next, a sample was homogenized, 50 g of the homogenized sample was weighed, and 50 mL of pure water was added. Then, centrifugation was carried out, so that a supernatant was obtained. To a residue, 50 mL of pure water was added again. Then, centrifugation was carried out, so that a supernatant was obtained. To a solution obtained by combining these supernatants, an internal standard substance (100 ppm cyclohexanol) was added. A resultant solution was passed through the column (20 ml) described earlier so as to be washed with pure water, and then an aroma component was eluted with ether from the column. An eluate thus obtained was dehydrated, concentrated, and injected into a gas chromatograph-mass spectrometer (GCMS QP 2010, manufactured by Shimadzu Corporation), so that an analysis was carried out. The following shows analysis conditions:

GC condition
Column: DB-Wax capillary column (Agilent J&W), 60 m×0.25 mm id×0.25 μm film thickness
Column temperature: maintained at an initial temperature of 40° C. for 10 minutes, raised to 220° C. at 3.0° C./min, maintained at 220° C. for 15 minutes, raised to 245° C. at 10.0° C./min, and maintained at 245° C. for 20 minutes
Vaporizing chamber temperature: 230° C.
Injection mode: Split; split ratio of 1:60
Carrier gas: He
Column inlet pressure: 149.6 kPa
Linear velocity: 30.0 ml/min
Purge flow rate: 3 ml/min
Injection volume: 1.0 μl
MS condition
Ion source temperature: 200° C.
Interface temperature: 230° C.
Detector gain voltage: 1.05 kV
Scan MS: m/z: 29-350

LabSolutions-GCMSsolution version 2.72 (manufactured by Shimadzu Corporation) was used as software for assay and analysis. In this case, a compound of a volatile component was identified by (i) comparing (a) a mass spectrum of a component having a specific retention time, the mass spectrum having been obtained in gas chromatography-mass spectrometry, (b) a mass spectrum similarly obtained with use of a standard, and (c) a mass spectrum of the published library WILEY7, and (ii) comparing (d) Kovats Indices of peaks of those mass spectra and (e) a Kovats Index of the standard.

Note that the volatile component was identified and determined as below. Specifically, the volatile component was identified with no use of a total ion area but with use of target ions and reference ions, and a ratio at which the target ions and the reference ions are relative to each other. A target ion area was used to calculate a total ion area at a ratio of the target ions to total ions of the volatile component of the published library WILEY7 so that a quantitative calculation was carried out. Similarly, the quantitative calculation was carried out also with respect to an internal standard substance cyclohexanol. A concentration of the volatile component was expressed as a concentration (ppb) relative to the internal standard substance cyclohexanol.

Measurement of Water Content

A water content was measured by a constant weight drying method at 70° C. under reduced pressure.

Measurement of Sugar Content

A sugar content meter (product number: N-1E, manufactured by ATAGO CO., LTD.) was used to measure a sugar content (Brix degree).

Measurement of Chromaticity

A chromameter (product number: CR-400 (C light source), manufactured by KONICA MINOLTA, INC.) was used to measure $L^*a^*b^*$ values of the CIE color difference system.

Sensory Evaluation

A sensory evaluation was carried out with respect to each frozen strawberry as below. The evaluation was carried out by seven male and female employees in their twenties to fifties who belong to the applicant of the present application and are eligible for sensory evaluation in their company. An average of scores given by those employees was calculated.

A color, sweetness, sourness, and a mouthfeel were evaluated on a scale of 1 to 5. A better color and a stronger sweetness each achieved a higher score assuming that the highest score was 5. A worse color and a weaker sweetness each achieved a lower score assuming that the lowest score was 1. A stronger sourness achieved a higher score assuming that the highest score was 5. A weaker sourness achieved a lower score assuming that the lowest score was 1. A frozen strawberry that was moderately soft and was easier to sink a tooth into achieved a higher score assuming that the highest score was 5. A frozen strawberry that was unsatisfactory due to its hardness or excessive softness achieved a lower score assuming that the lowest score was 1.

Scents and odors, i.e., a fruit-like scent, an acid smell, a green scent, a sweet scent, a freezing odor, and a heating odor were evaluated on a scale of 1 to 5. A stronger scent or odor achieved a higher score assuming that the highest score was 5. A weaker scent or odor achieved a lower score assuming that the lowest score was 1.

Tables 1 to 3 show results of the above measurement and evaluation.

TABLE 1

|  | Ex.* 1 | Ex. 2 | Ex. 3 | Comp. Ex.* 1 | Comp. Ex. 2 | Comp. Ex. 3 | Comp. Ex. 4 | Comp. Ex. 5 | Comp. Ex. 6 | Ex. 4 | Ex. 5 | Comp. Ex. 7 |
|---|---|---|---|---|---|---|---|---|---|---|---|---|
| Variety | Sagaho-noka | Albion | Monterey | Albion | Sagaho-noka | Sagaho-noka | Sagaho-noka | Sagaho-noka | Company A | Sagaho-noka | Sagaho-noka | Sagaho-noka |
| Heating | YES | YES | YES | NO | NO | NO | YES | YES | Unclear | YES | YES | YES |
| Sugar impregnation | YES | YES | YES | NO | NO | NO | NO | NO | NO | YES | YES | YES |
| Freezing | YES | YES | YES | YES | YES | NO | YES | YES | YES | YES | YES | YES |
| Breaking load (g) | 13,881 | 18,055 | 18,285 | 47,184 | 36,277 | 1,931 | 1,375 | 36,154 | 47,700 | 25,376 | 28,500 | 48,444 |
| Breaking strain factor (%) | 27 | 19 | 25 | 8 | 9 | 21 | 22 | 8 | 10 | 16 | 23 | 15 |
| 2-methylbutanoic acid ethyl (Fruit-like scent) | 741 | 207 | 300 | 63 | 0 | 0 | 6 | 0 | 0 | 207 | 261 | 125 |
| Ethyl hexanoate (Fruit-like scent) | 5,134 | 554 | 577 | 249 | 67 | 201 | 622 | 216 | 71 | 1,650 | 1,328 | 484 |
| 2-methylbutanoic acid (Acid smell) | 596 | 114 | 318 | 1,499 | 5,082 | 3,204 | 4,269 | 4,114 | 1,896 | 406 | 476 | 4,341 |
| Methyl propionate (Fruit-like scent) | 26 | 3 | 4 | 38 | 20 | 22 | 17 | 18 | 18 | 20 | 12 | 1 |
| Ethyl hexanoate/ 2-methylbutanoic acid | 8.61 | 4.86 | 1.81 | 0.17 | 0.01 | 0.06 | 0.15 | 0.05 | 0.04 | 4.07 | 2.79 | 0.11 |
| Water content (%) | 76.9 | 76.6 | 73.8 | 88.1 | 92.1 | 89.7 | 89.7 | 91.2 | 75.8 | 77.2 | 87.6 |  |
| Sugar content | 25.2 | 24.8 | 24.0 | 9.0 | 9.0 | 9.0 | 9.0 | 9.0 | 10.0 | 24.2 | 24.8 | 27.5 |

* "Ex." stands for "Example", and "Comp. Ex." stands for "Comparative Example".

TABLE 2

|  | Ex.* 1 | Ex. 2 | Ex. 3 | Comp. Ex.* 1 | Comp. Ex. 2 | Comp. Ex. 3 | Comp. Ex. 4 | Comp. Ex. 5 | Comp. Ex. 6 | Ex. 4 | Ex. 5 | Comp. Ex. 7 |
|---|---|---|---|---|---|---|---|---|---|---|---|---|
| Color | 3.7 | 4.4 | 4.4 | 3.9 | 4.0 | 5.0 | 4.9 | 4.0 | 4.1 | 2.7 | 2.0 | 1.4 |
| Sweetness | 4.7 | 3.9 | 3.9 | 1.6 | 1.3 | 2.6 | 2.6 | 1.4 | 1.3 | 4.1 | 3.6 | 2.5 |
| Sourness | 3.5 | 3.4 | 3.1 | 3.0 | 2.4 | 3.6 | 3.4 | 2.6 | 3.6 | 2.6 | 2.4 | 2.5 |
| Mouthfeel | 4.6 | 4.4 | 4.1 | 1.6 | 1.7 | 3.9 | 2.9 | 1.4 | 2.0 | 4.0 | 3.4 | 1.5 |
| [Scent/odor] |  |  |  |  |  |  |  |  |  |  |  |  |
| Fruit-like scent | 4.6 | 4.0 | 3.9 | 1.6 | 1.6 | 3.7 | 3.7 | 1.7 | 1.6 | 3.4 | 3.1 | 1.4 |
| Acid smell | 1.8 | 1.9 | 2.1 | 3.1 | 3.2 | 3.0 | 3.0 | 3.4 | 4.1 | 2.4 | 2.6 | 3.2 |
| Green scent | 2.0 | 2.1 | 2.3 | 2.7 | 3.1 | 3.9 | 3.6 | 3.0 | 4.1 | 1.6 | 2.0 | 2.4 |
| Sweet scent | 4.1 | 3.8 | 3.6 | 1.3 | 1.6 | 2.7 | 2.7 | 1.6 | 1.6 | 3.8 | 3.5 | 2.0 |
| Freezing odor | 1.3 | 1.3 | 1.4 | 2.9 | 2.7 | 1.0 | 1.1 | 2.7 | 2.9 | 1.6 | 1.4 | 2.7 |
| Heating odor | 1.3 | 1.3 | 1.4 | 1.4 | 1.3 | 1.0 | 1.5 | 1.7 | 1.6 | 1.4 | 2.4 | 4.0 |

* "Ex." stands for "Example", and "Comp. Ex." stands for "Comparative Example".

TABLE 3

|  | Ex.* 1 | Ex. 2 | Ex. 3 | Comp. Ex.* 1 | Comp. Ex. 2 | Comp. Ex. 3 | Comp. Ex. 4 | Comp. Ex. 5 | Ex. 4 | Ex. 5 | Comp. Ex. 7 |
|---|---|---|---|---|---|---|---|---|---|---|---|
| Chromaticity of pulp part |  |  |  |  |  |  |  |  |  |  |  |
| Lightness (L) | 45.3 | 31.7 | 30.8 | 30.5 | 40.6 | 34.4 | 36.5 | 38.4 | 49.1 | 46.7 | 50 |
| Red (a) | 34.3 | 34.2 | 27.5 | 31.1 | 39.2 | 42.6 | 33.2 | 40.8 | 26.9 | 27.9 | 18.1 |
| Yellow (b) | 19.1 | 16.2 | 10.6 | 13.6 | 24.2 | 27.5 | 22.1 | 26.8 | 14.3 | 16.2 | 12.2 |
| Chromaticity of calyx part |  |  |  |  |  |  |  |  |  |  |  |
| Lightness (L) | 51.8 | 36.8 | 35.6 | 31.3 | 58.8 | 48.6 | 41.8 | 53.1 | 51.5 | 52.3 | 49.1 |
| Red (a) | 24.4 | 28.9 | 24.7 | 29.4 | 15.7 | 36.1 | 33.9 | 21.4 | 20.4 | 20.2 | 12.8 |
| Yellow (b) | 16.6 | 15 | 13.7 | 12.4 | 15.9 | 30 | 26.7 | 17 | 14.4 | 14 | 10.5 |

* "Ex." stands for "Example", and "Comp. Ex." stands for "Comparative Example"

Examples 1 to 5 show that the frozen strawberry that has a breaking load of not less than 10000 g and not more than 30000 g, and a breaking strain factor of not less than 15% makes it possible to obtain (i) a frozen strawberry that is frozen but is easy to sink a tooth into and has an excellent mouthfeel and (ii) a frozen strawberry that is also excellent in taste, color tone, and scent. The frozen strawberries of Examples 1 to 5 each contain 2-methylbutanoic acid and ethyl hexanoate, and the ethyl hexanoate is contained in an amount of not less than 1 part by weight with respect to 1 part by weight of the 2-methylbutanoic acid. Such a frozen strawberry is found to make it possible to obtain a frozen strawberry that is excellent in taste and scent.

Example 6

Sagahonoka was used as a raw strawberry. A calyx of the strawberry was removed, and then the strawberry was washed with water.

Heating Step

The strawberry thus washed was stored in a basket and immersed in a hot water bath, having a temperature of 85° C., for 60 seconds so as to be heated for sterilization. The strawberry thus heated was water-cooled for 1 minute.

Sugar Immersion Step

The strawberry was immersed in a sugar solution (containing fruit sugar in an amount of 45% by mass, citric acid in an amount of 0.3% by mass, and water in an amount of 54.7% by mass) at an immersion temperature of 5° C. for 32 hours. The sugar solution was used in an amount of 400 g with respect to 500 g of strawberries.

Freezing Step

The strawberry having been subjected to the sugar immersion step was frozen by IQF freezing at a temperature of not more than −20° C. so that a frozen strawberry in accordance with an aspect of the present invention was prepared.

Examples 7 and 8

A frozen strawberry was prepared as in the case of Example 6 except that the immersion time for which to immerse the strawberry in the sugar solution was set to 48 hours (in Example 7) and to 4 days (in Example 8).

Example 9

A frozen strawberry was prepared as in the case of Example 6 except that the temperature of the sugar solution was set to 20° C.

Example 10

A frozen strawberry was prepared as in the case of Example 9 except that the immersion time for which to immerse the strawberry in the sugar solution was set to 48 hours.

Comparative Examples 8 and 9

A frozen strawberry was prepared as in the case of Example 6 except that the immersion time for which to immerse the strawberry in the sugar solution was set to 8 hours (in Comparative Example 8) and to 24 hours (in Comparative Example 9).

Comparative Example 10

Instead of a raw strawberry, a strawberry obtained by temporarily freezing a raw strawberry by IQF freezing and then defreezing the strawberry thus frozen was used. Except for this point, a frozen strawberry was prepared as in the case of Example 8.

Comparative Examples 11 and 12

A frozen strawberry was prepared as in the case of Example 9 except that the immersion time for which to immerse the strawberry in the sugar solution was set to 8 hours (in Comparative Example 11) and to 24 hours (in Comparative Example 12).

Comparative Examples 13 to 16

A frozen strawberry was prepared as in the case of Example 6 except that the temperature of the sugar solution was set to 35° C., and the immersion time for which to immerse the strawberry in the sugar solution was set to 8 hours (in Comparative Example 13), to 24 hours (in Comparative Example 14), to 32 hours (Comparative Example 15), and to 48 hours (in Comparative Example 16).

Determination and Evaluation

As in the case of the evaluation carried out with respect to Example 1, a breaking load, a breaking strain factor, an aroma component, and a sugar content were determined, and a sensory evaluation was carried out. Tables 4 and 5 show results of the above determination and evaluation.

TABLE 4

| | Comp. Ex.* 8 | Comp Ex. 9 | Ex. * 6 | Ex. 7 | Ex. 8 | Comp Ex. 10 | Comp. Ex. 11 | Comp. Ex. 12 | Ex. 9 | Ex. 10 | Comp. Ex. 13 | Comp. Ex. 14 | Comp. Ex. 15 | Comp. Ex. 16 |
|---|---|---|---|---|---|---|---|---|---|---|---|---|---|---|
| | \multicolumn{6}{c}{5° C.} | | | | | | | | | |
| Temperature | | | | | | | 20° C. | | | | 35° C. | | | |
| Time | 8 hours | 24 hours | 32 hours | 48 hours | 4 days | 4 days after IQF | 8 hours | 24 hours | 32 hours | 48 hours | 8 hours | 24 hours | 32 hours | 48 hours |
| IQF | | | | | | | | | | | | | | |
| Breaking load (g) | 31,278 | 27,390 | 21,838 | 13,225 | 13,882 | 7,167 | 12,874 | 13,260 | 14,018 | 13,976 | 14,876 | 8,509 | 7,123 | 6,749 |
| Breaking strain factor (%) | 9 | 12 | 15 | 18 | 24 | 20 | 10 | 10 | 16 | 20 | 14 | 16 | 16 | 19 |
| 2-methyl-butanoic acid ethyl (fruit-like scent) | 293 | 310 | 307 | 301 | 345 | 1 | 235 | 338 | 356 | 311 | 177 | 211 | 228 | 262 |
| Ethyl hexanoate (Fruit-like scent) | 7,594 | 7,574 | 6,835 | 6,987 | 6,094 | 51 | 8,512 | 9,399 | 8,644 | 7,855 | 9,430 | 5,447 | 3,455 | 528 |
| 2-methyl butanoic-acid (Acid smell) | 4,261 | 4,119 | 4,308 | 4,671 | 4,401 | 2,288 | 3,844 | 4,871 | 5,250 | 4,821 | 3,426 | 3,462 | 3,479 | 3,515 |

TABLE 4-continued

| | Comp. Ex.* 8 | Comp Ex. 9 | Ex.* 6 | Ex. 7 | Ex. 8 | Comp Ex. 10 | Comp. Ex. 11 | Comp. Ex. 12 | Ex. 9 | Ex. 10 | Comp. Ex. 13 | Comp. Ex. 14 | Comp. Ex. 15 | Comp. Ex. 16 |
|---|---|---|---|---|---|---|---|---|---|---|---|---|---|---|
| Methyl propionate (Fruit-like scent) | 33 | 34 | 35 | 36 | 40 | 26 | 26 | 30 | 28 | 31 | 23 | 21 | 24 | 18 |
| Ethyl hexanoate/ 2-methyl-butanoic acid | 1.78 | 1.84 | 1.59 | 1.50 | 1.38 | 0.02 | 2.21 | 1.93 | 1.65 | 1.63 | 2.75 | 1.57 | 0.99 | 0.15 |
| Sugar content | 11.0 | 13.0 | 18.0 | 19.5 | 21.6 | 24.0 | 13.0 | 14.0 | 22.8 | 24.0 | 16.0 | 21.0 | 20.0 | 24.5 |

* "Comp. Ex." stands for "Comparative Example", and "Ex." stands for "Example".

TABLE 5

| | Comp. Ex.* 8 | Comp. Ex. 9 | Ex.* 6 | Ex. 7 | Ex. 8 | Comp. Ex. 10 | Comp. Ex. 11 | Comp. Ex. 12 | Ex. 9 | Ex. 10 | Comp. Ex. 13 | Comp. Ex. 14 | Comp. Ex. 15 | Comp. Ex. 16 |
|---|---|---|---|---|---|---|---|---|---|---|---|---|---|---|
| Color | 4.9 | 4.2 | 4.2 | 4.2 | 3.8 | 1.8 | 3.6 | 3.3 | 2.9 | 2.8 | 2.3 | 1.6 | 1.3 | 1.1 |
| Sweetness | 1.9 | 2.6 | 3.1 | 3.9 | 4.9 | 3.6 | 2.3 | 3.1 | 2.9 | 3.6 | 2.1 | 2.5 | 2.5 | 2.6 |
| Sourness | 3.0 | 2.9 | 2.9 | 3.1 | 3.2 | 2.4 | 2.9 | 2.7 | 2.6 | 2.6 | 2.5 | 2.4 | 2.1 | 2.4 |
| Mouthfeel | 2.5 | 2.7 | 3.7 | 3.9 | 4.8 | 2.3 | 2.5 | 2.8 | 3.2 | 3.5 | 2.4 | 2.1 | 1.9 | 2.0 |
| [Scent/odor] | | | | | | | | | | | | | | |
| Fruit-like scent | 2.4 | 2.4 | 3.3 | 3.9 | 4.4 | 2.8 | 2.4 | 3.0 | 3.0 | 3.1 | 1.9 | 1.8 | 1.5 | 1.2 |
| Acid smell | 3.7 | 3.8 | 2.9 | 2.4 | 1.4 | 2.9 | 3.6 | 2.4 | 3.2 | 3.0 | 3.0 | 2.6 | 2.2 | 2.7 |
| Green scent | | 3.9 | 3.6 | 2.9 | 2.2 | 1.6 | 3.0 | 3.4 | 2.4 | 2.6 | 2.7 | 2.4 | 2.0 | 2.3 |
| Sweet scent | | 1.7 | 2.1 | 2.9 | 3.3 | 4.3 | 3.0 | 2.9 | 3.3 | 3.0 | 2.1 | 2.4 | 2.1 | 2.2 |
| Freezing odor | 2.7 | 2.6 | 2.3 | 2.4 | 1.4 | 2.9 | 2.7 | 2.0 | 2.7 | 2.4 | 2.8 | 2.5 | 2.1 | 2.5 |
| Heating odor | 2.5 | 2.7 | 2.5 | 2.5 | 1.9 | 2.9 | 2.9 | 2.5 | 2.7 | 2.7 | 3.1 | 3.2 | 3.1 | 3.4 |

* "Comp. Ex." stands for "Comparative Example", and "Ex." stands for "Example".

Examples 6 to 10 show that a method for producing a frozen strawberry, including: a heating step of using water, having a temperature of not less than 70° C. and not more than 100° C., to heat a strawberry, which is raw, for not less than 1 second and not more than 180 seconds; a sugar immersion step of immersing the strawberry, having been subjected to the heating step, in a sugar solution for not less than 32 hours and not more than 7 days, the sugar solution having a temperature of not less than 0° C. and not more than 20° C.; and a freezing step of freezing the strawberry having been subjected to the sugar immersion step makes it possible to (i) obtain a frozen strawberry that has an excellent mouthfeel and (ii) obtain a frozen strawberry that is also excellent in taste, color tone, and scent.

There is no significant difference in aroma component between (a) Examples 6 to 10 and (b) Comparative Examples 10 to 16. Note, however, Examples 6 to 10 are found to be superior in fruit-like scent and sweet scent to Comparative Examples 10 to 16 in many cases. This shows that the frozen strawberry of the present invention, which frozen strawberry has a mouthfeel that is moderately soft and allows a tooth to be easily sunk into the frozen strawberry, made it easy for a subject to detect an fruit-like scent and a sweet scent.

The invention claimed is:

1. A frozen strawberry having:
   a breaking load of not less than 10000 g and not more than 30000 g; and
   a breaking strain factor of not less than 15%,
   the breaking load and the breaking strain factor each being determined by a measurement, with use of a plunger that is cylindrical and has a diameter of 0.5 inches, at an air temperature of −16° C. to −18° C., a speed of 2 mm/sec, and a compressive strain factor of 80%, the measurement involving (i) cutting lengthwise the frozen strawberry into halves, (ii) placing one of the halves on a sample stage such that a cross section of the one of the halves faces downward, (iii) positioning the one of the halves so that the plunger will be inserted into a highest part of the one of the halves, and (iv) inserting the plunger into the highest part.

2. The frozen strawberry as set forth in claim 1, wherein the frozen strawberry contains 2-methylbutanoic acid and ethyl hexanoate, and
   the ethyl hexanoate is contained in an amount of not less than 1 part by weight with respect to 1 part by weight of the 2-methylbutanoic acid.

3. The frozen strawberry as set forth in claim 2, wherein the frozen strawberry further contains 2-methylbutanoic acid ethyl, and
   the 2-methylbutanoic acid ethyl is contained in an amount of not less than 200 ppb.

4. The frozen strawberry as set forth in claim 2, wherein the ethyl hexanoate is contained in an amount of not less than 500 ppb.

5. A method for producing the frozen strawberry of claim 1, comprising:
   a heating step of using water, having a temperature of not less than 70° C. and not more than 100° C., to heat a strawberry, which is raw, for not less than 1 second and not more than 180 seconds;

a sugar immersion step of immersing the strawberry, having been subjected to the heating step, in a sugar solution for not less than 32 hours and not more than 7 days, the sugar solution having a temperature of not less than 0° C. and not more than 20° C.; and a freezing step of freezing the strawberry having been subjected to the sugar immersion step.

* * * * *